United States Patent [19]
Hoopman

[11] Patent Number: 4,588,258
[45] Date of Patent: May 13, 1986

[54] CUBE-CORNER RETROREFLECTIVE ARTICLES HAVING WIDE ANGULARITY IN MULTIPLE VIEWING PLANES

[75] Inventor: Timothy L. Hoopman, River Falls, Wis.

[73] Assignee: Minnesota Mining and Manufacturing Company, St. Paul, Minn.

[21] Appl. No.: 634,111

[22] Filed: Jul. 30, 1984

Related U.S. Application Data

[63] Continuation-in-part of Ser. No. 531,349, Sep. 12, 1983, abandoned.

[51] Int. Cl.$^4$ .................... G02B 5/122; G02B 5/124
[52] U.S. Cl. ........................................ 350/103; 350/102
[58] Field of Search ............... 350/97, 100, 102, 103, 350/129

[56] References Cited

U.S. PATENT DOCUMENTS

| | | | |
|---|---|---|---|
| Re. 29,396 | 9/1977 | Heenan | 204/281 |
| 3,057,256 | 10/1962 | Erban | 88/28 |
| 3,140,340 | 7/1964 | Weber | 88/82 |
| 3,450,459 | 6/1969 | Haggerty | 350/103 |
| 3,541,606 | 11/1970 | Heenan et al. | 350/103 |
| 3,712,706 | 1/1973 | Stamm | 350/103 |
| 3,923,378 | 12/1975 | Heenan | 350/103 |
| 4,025,159 | 5/1977 | McGrath | 350/105 |
| 4,066,331 | 1/1978 | Lindner | 350/103 |
| 4,202,600 | 5/1980 | Burke et al. | 350/103 |
| 4,303,305 | 12/1981 | Jones | 350/103 |
| 4,349,598 | 9/1982 | White | 428/161 |

*Primary Examiner*—Bruce Y. Arnold
*Assistant Examiner*—William Propp
*Attorney, Agent, or Firm*—Donald M. Sell; James A. Smith; Roger R. Tamte

[57] ABSTRACT

Cube-corner retroreflective articles having improved angularity along multiple viewing planes are provided. The articles comprise at least one matched pair of cube-corner retroreflective elements which are rotated 180° with respect to one another, the three lateral mutually perpendicular faces of the elements being defined at their bases by linear edges that lie in a common plane, and the optical axes of the elements being tilted toward one another.

8 Claims, 10 Drawing Figures

CUBE-CORNER RETROREFLECTIVE ARTICLES HAVING WIDE ANGULARITY IN MULTIPLE VIEWING PLANES

REFERENCE TO RELATED APPLICATION

This application is a continuation-in-part of application Ser. No. 531,349 filed Sept. 12, 1983 now abandoned.

BACKGROUND OF THE INVENTION

The basic cube-corner retroreflective element used in cube-corner retroreflective articles has a notoriously low angularity, i.e., the element will only brightly retroreflect light that impinges on it within a narrow angular range centering approximately on its optical axis. Low angularity arises by the inherent nature of these elements, which are trihedral structures having three mutually perpendicular lateral faces, such as occur at the corner of a cube. In use, the elements are arranged so that light to be retroreflected impinges into the internal space defined by the faces, and retroreflection of the impinging light occurs by internal reflection of the light from face to face of the element. Impinging light that is inclined substantially away from the optical axis of the element (which is the trisector of the internal space defined by the faces of the element) strikes a face at an angle less than its critical angle, thereby passing through the face rather than being reflected.

Some workers have addressed this problem by coating the trihedral faces of the cube-corner element with specularly reflective metal, e.g., vapor-deposited aluminum, to cause even highly inclined light to be reflected by the faces. But such coatings reduce overall reflection from the faces (because a percentage of light impinging on the faces is absorbed by the coating), and introduce a gray color to the element which is often objectionable. Also the coatings could be susceptible to corrosion problems that would limit the useful life of an article having such elements.

Others have addressed the problem by arranging a second retroreflective plate or sheet in back of a first retroreflective plate or sheet (see Weber, U.S. Pat. No. 3,140,340, McGrath, U.S. Pat. No.4,025,159, or Jones, U.S. Pat. No. 4,303, 305), but such an approach is expensive and provides a thick and generally rigid construction not suited for many uses.

Others have addressed the problem by attempting to change the configuration of the cube-corner retroreflective elements, but none of these efforts has provided a practically manufactured sheeting suitable for the most common uses of retroreflective sheeting (e.g., on traffic signs, license plates, advertising signs, etc.). For example, White, U.S. Pat. No. 4,349,598 teaches a limited-use broader-angularity retroreflective sheeting obtained by tilting the central axes of the cube-corner elements to an approximately 35-degree angle and joining two adjacent elements into a right triangle prism or "pup-tent"-like configuration. Such cube-corner retroreflective elements achieve retroreflection of light having incidence angles (the angle between the incident light and a line perpendicular to the sheeting) approaching 90°, which makes them useful particularly for pavement markings or the like. But 0°-incidence angle light (light that is perpendicular to the sheeting) is not reflected, and accordingly the sheeting is not useful for conventional traffic signs.

The desire for a thin pliable cube-corner retroreflective sheeting that would reflect inclined light is recognized in Haggerty, U.S. Pat. No. 3,450,459, but the patent teaches no practical method for achieving such a result. Thin pliable sheeting requires that the cube-corner elements be of very small "microsizes," which so far as known, have only been accomplished by grooving techniques for which the elements taught in Haggerty are not adapted.

Prior efforts have also been made to increase the angular range of reflector plates that use larger cube-corner retroreflective elements, such as the reflector plates mounted on vehicles. The molds for such reflector plates are generally made by bundling together individual mold parts, typically pins which each have an end portion shaped like a cube-corner, retroreflective element. Heenan et al, U.S. Pat. No. 3,541,606, teaches reflector plates for vehicles containing cube-corner retroreflective elements arranged into discrete, rather large groups. The optical axes of the cube-corner elements in each group are inclined at angles different from the angles of the elements of a different group so as to increase the angular range of reflection in a horizontal plane around a vehicle. Heenan, U.S. Pat No. 3,923,378 and Heenan, U.S. Pat. No. Re: 29,396 teach an improvement in which the cube-corner retroreflective elements are arranged in rows, and the optical axes of the cube-corner elements of one row are inclined towards the elements of the other row, for example, in an amount between about 6° and 13° (see column 5, line 45 et seq. of U.S. Pat. No. 3,923,378). Such tilting is intended to increase the angularity of the reflector plate in a predetermined plane (see column 5, lines 64 and 65), which is typically the horizontal plane around a vehicle in other embodiments (see FIGS. 19 and 31 of either U.S. Pat. No. Re. 29,396 or U.S. Pat. No. 3,923,378), increased angularity is obtained in two planes by mixing two different sets of cube-corner retroreflective elements, one set comprising cube-corner elements inclined towards one another in one of the planes of desired increased angularity, and the other set comprising cube-corner elements that are inclined towards one another in the other of the planes of desired increased angularity. Lindner, U.S. Pat. No. 4,066,331, has a similar objective with cube-corner retroreflective elements arranged in rows.

The noted improvement as to the angularity of reflector plates in one plane, such as the horizontal plane around a vehicle, has less value for other kinds of retroreflective articles. Retroreflective sheeting, in particular, is generally intended for use on large-area surfaces that are viewed over their whole surface and from many angles. For reflective sheeting used on sign faces it is important to maintain a uniform brightness over the whole surface of the sheeting irrespective of the viewing angle, so that the whole sign has uniform brightness, and so that the legends or symbols on the sign are legible. Legibility requires control of the contrast between the graphic images and background area of the sign and such control of contrast requires uniformity in reflective brightness over the whole viewing surface.

DISCLOSURE OF THE INVENTION

The present invention provides a new cube-corner retroreflective article which exhibits wide retroreflective angularity in multiple viewing planes, and which is based on cube-corner retroreflective elements that can be adapted for manufacture in microsizes such as needed in thin flexible retroreflective sheeting.

In brief summary, a new retroreflective article of the invention comprises at least one pair of cube-corner retroreflective elements which are rotated 180° with respect to one another, which have three mutually perpendicular lateral faces defined at their bases by linear edges that lie in a common plane, and which have optical axes tilted towards one edge of the element (when considered from the front surface of the article, on which light to be retroreflected impinges). It has been found that such a "matched" pair of tilted cube-corner elements produces a wide retroreflective angularity not only in a plane that is perpendicular both to the common plane and the edge toward which the optical axis of an element is tilted, but also in a plane that is perpendicular to that plane and the common plane. Further, such a pair has good angularity in planes intermediate those two planes, i.e., throughout a full 360°-range of viewing planes.

In thin sheeting form, a new retroreflective article of the invention typically comprises a dense array of micro-sized cube-corner retroreflective elements arranged in matched pairs with the axes of the elements in each pair being tilted toward one another (i.e., the edge toward which the optical axis of each pair or elements are tilted is typically a common edge between the elements). Preferably, for sheeting made from polymeric material having indices of refraction of about 1.5, the axes of the elements are tilted to an angle between about 7 and slightly less than 10 degrees from a position perpendicular to the common plane in which the base edges of the lateral faces lie.

The new retroreflective article is adapted to manufacture in sheeting form because the base edges of the lateral faces of the cube-corner elements lie in a common plane. As noted above, tooling for molding thin flexible cube-corner retroreflective sheeting has previously been made by grooving techniques. In these techniques a master plate is grooved with three sets of parallel V-shaped grooves that intersect to form cube-corner elements (see Erban, U.S. Pat. No. 3,057,256 and Stamm, U.S. Pat No. 3,712,706). Since the present invention uses cube-corner elements having full triangular lateral faces, with base edges in a common plane, they may be formed by such grooving techniques, with the stated common plane being established by the bottom edges of the grooves.

DETAILED DESCRIPTION

Figure 1:
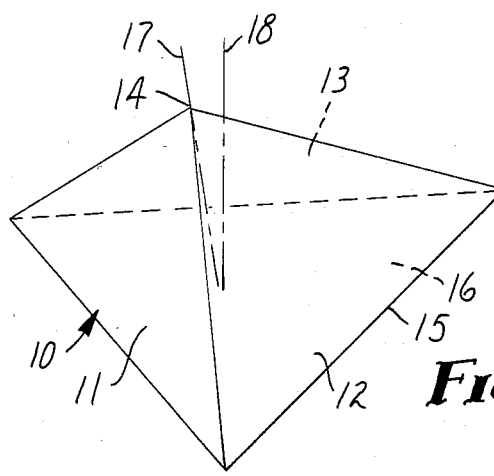
FIG. 1 is a perspective view showing a cube-corner retroreflective element used in a retroreflective article of the invention.
Figure 2A:
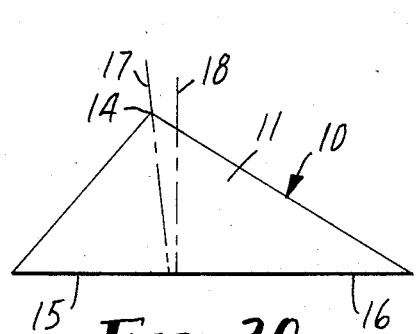
FIGS. 2a, 2b, and 2c are side elevational views of the lateral faces of the cube-corner element shown in FIG. 1.
Figure 2B:
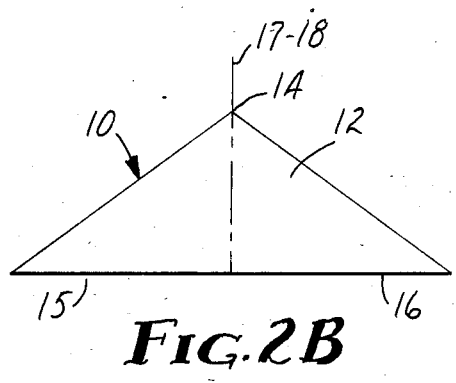
Figure 2C:
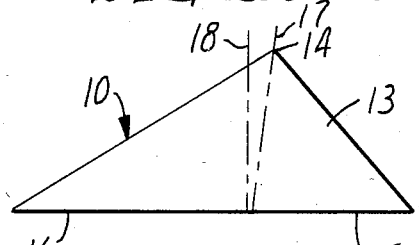

A cube-corner retroreflective element useful in a retroreflective article of the invention is shown in perspective view in FIGS. 1 and in side elevation views in FIGS. 2a, 2b, and 2c. As shown, the element 10 has three mutually perpendicular lateral faces 11, 12, and 13 which meet at the apex 14. The base edges 15 of the lateral faces 11, 12, and 13 are linear and lie in a single plane, i.e., the base plane 16 of the element. The element 10 also has a central or optical axis 17, which is a trisector of the internal angle defined by the lateral faces 11, 12, and 13 and which is tilted with respect to a line 18 perpendicular to the base plane 16. Retroreflection will occur when light incident on the base plane 16 of the element is internally reflected by one of the three lateral faces to a second face, then to a third face, and then back through the base toward the source of light.

In retroreflective articles of the invention, a cube-corner element as shown in FIGS. 1 and 2 is generally used with at least one other cube-corner element as part of a matched pair, and commonly is used with an array of such elements. The other cube-corner elements as they might appear in such an array of elements are shown in plan view in FIG. 3, which pictures the back of a representative retroreflective article of the invention 20. The elements are joined together, e.g., by being formed as a part of a single integral sheet material or by being attached at their base plane 16 to a carrier film. FIG. 4 shows in section view a portion of the article pictured in FIG. 3, and shows a thickness 21 of material, such as a polymeric film, connecting the elements together. Because the base edges 15 of the element 10 are linear and in a common plane, an array of such elements is defined by intersecting sets of grooves. Element $10_1$ in FIG. 3 is defined by three V-shaped grooves 22, 23, and 24, which are each one member of three sets of grooves which cross the array in an intersecting pattern.

Figure 4B:
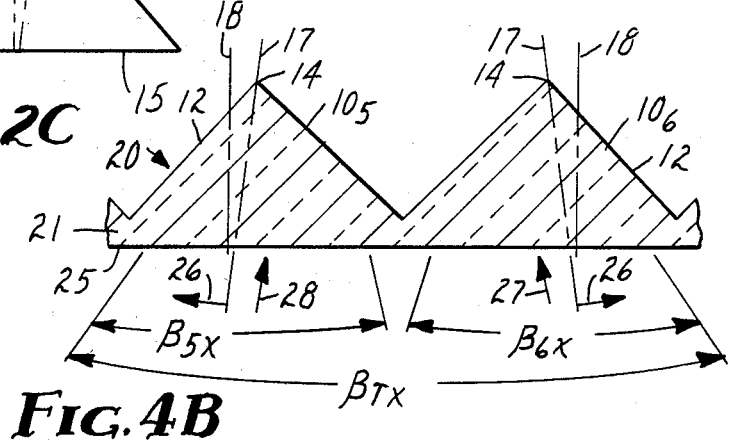
FIGS. 4A and 4B are sectional views taken along the lines 4A—4A and 4B—4B of FIG. 3 showing particularly two representative matched pairs of cube-corner elements in retroreflective sheeting of the invention.
Figure 3:
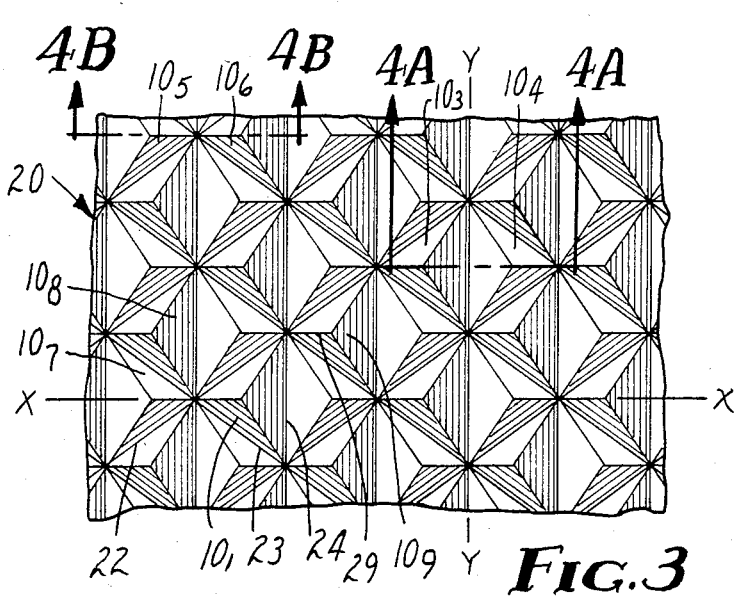
FIG. 3 is a plan view of a representative retroreflective sheeting of the invention with a dense array of cube-corner elements as pictured in FIGS. 1 and 2.
Figure 4A:
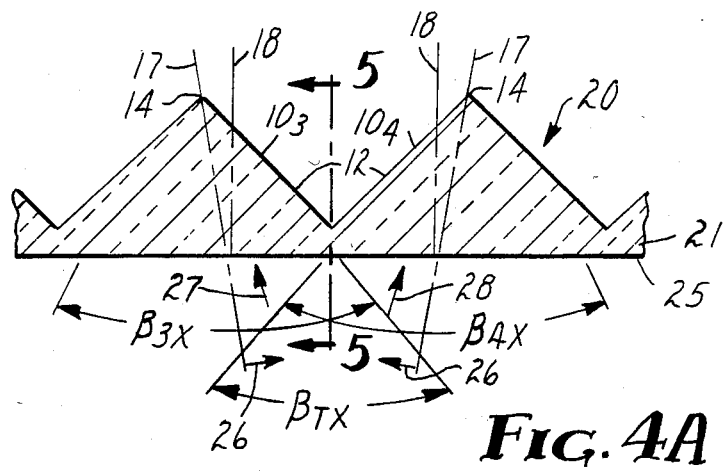

As seen from FIGS. 3, 4A, 4B, and 5, the cube-corner elements in the illustrated representative retroreflective article of the invention can be considered as being arranged in pairs, with the optical axes of the elements in each pair being tilted or canted toward one edge of the elements, when considered from the front surface 25 of the article 20 on which light to be retroreflected impinges. FIG. 4A shows one such pair, $10_3$ and $10_4$, in which the edge toward which the optical axes 17 of the elements have been tilted or canted, i.e., in the direction of the arrows 26 in FIG. 4A, is a common edge. The cube-corner elements of the pair are identical, but they face in opposite directions, i.e., one is rotated 180° about the line 18 from the orientation of the other.

Other elements in the array pictured in FIG. 3 can be considered a pair besides the pair of FIG. 4A which abut at a common edge. Thus, elements $10_5$ and $10_6$ shown in FIG. 4B are also a matched pair, even though they abut at a point rather than an edge. They are such a pair, since they are identical except for being rotated 180° from one another. The optical axes of the elements $10_5$ and $10_6$ are tilted toward one edge, which is a matching edge in each element (i.e., upon rotation of one of the elements $10_5$ and $10_6$ in an amount of 180°, the edges toward which the optical axes are tilted would coincide).

The optical axes of the pairs of elements $10_3$ and $10_4$, and of $10_5$ and $10_6$, are in a single plane, but it should be noted that a pair of elements could have their axes in different planes. For example, the elements $10_7$ and $10_8$ in FIG. 3 can be considered as a pair. Whichever pair in FIG. 3 is considered, however, the tilting of the optical axes of the elements in the pair occurs in the same plane or in parallel planes, identified as the X-axis planes in FIG. 3.

The angular range of retroreflection from the tilted cube-corner elements of a pair combine to provide a broad angularity of reflection. The tilting of the elements in the X-axis plane shown in FIG. 3 shifts the angular range of reflection in that plane from being centered on a line perpendicular to the front surface of the article 20 to being centered on paths represented by the light rays 27 and 28 in FIGS. 4A and 4B. Each tilted cube-corner element 10 retroreflects with maximum brightness light that is incident on the article 20 on a path represented by light rays 27 and 28; and each element retroreflects with gradually reduced brightness light that is incident on the article 20 on paths further displaced from the paths 27 and 28. The angular ranges of reflection are arbitrarily represented by the ranges $\beta_{3X}$, $\beta_{4X}$, $\beta_{5X}$, and $\beta_{6X}$ in the drawings (actually, there is no sharp delineation of a range, but instead a gradual reduction in the brightness of retroreflection). As shown, one end of each of these ranges is more inclined than the other end of the range, indicating that more highly inclined light is reflected at that end of the range than at the other end. The more inclined ends of the range represent the ends of the combined ranges of reflection from a pair of elements, and the combined range is represented by $_{TX}$. The tilted elements combine to provide a broad angular range of retroreflection $\beta_{TX}$ in the X-axis plane, which is substantially larger than the representative ranges $\beta_{3X}$ and $\beta_{4X}$ or $\beta_{5X}$ and $\beta_{6X}$ provided by the individual elements.

Figure 5:
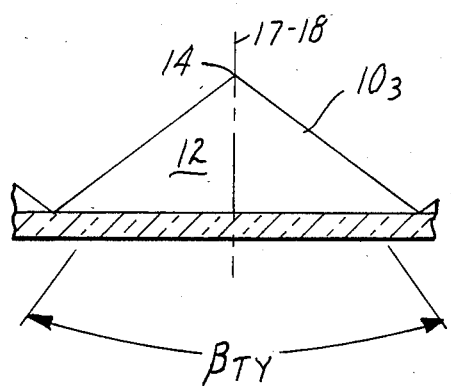
FIG. 5 is a sectional view taken along the lines 5—5 of FIG. 4A.

More than achieving a broadened angular range in the X-axis plane, however, it has now been found that the tilted elements also achieve a substantial increase in angular range in a Y-axis plane that is perpendicular to the X-axis plane (and to the base plane of the elements). Also, there is a substantial increase in angular range in planes intermediate the two perpendicular X and Y planes. As shown in FIG. 5, the angular range $\beta_{TY}$ of retroreflection in the Y-axis plane perpendicular to the X-axis plane is increased to a surprisingly large amount by the tilting of the elements, even though that tilting occurs in the X-axis plane.

Figure 6:
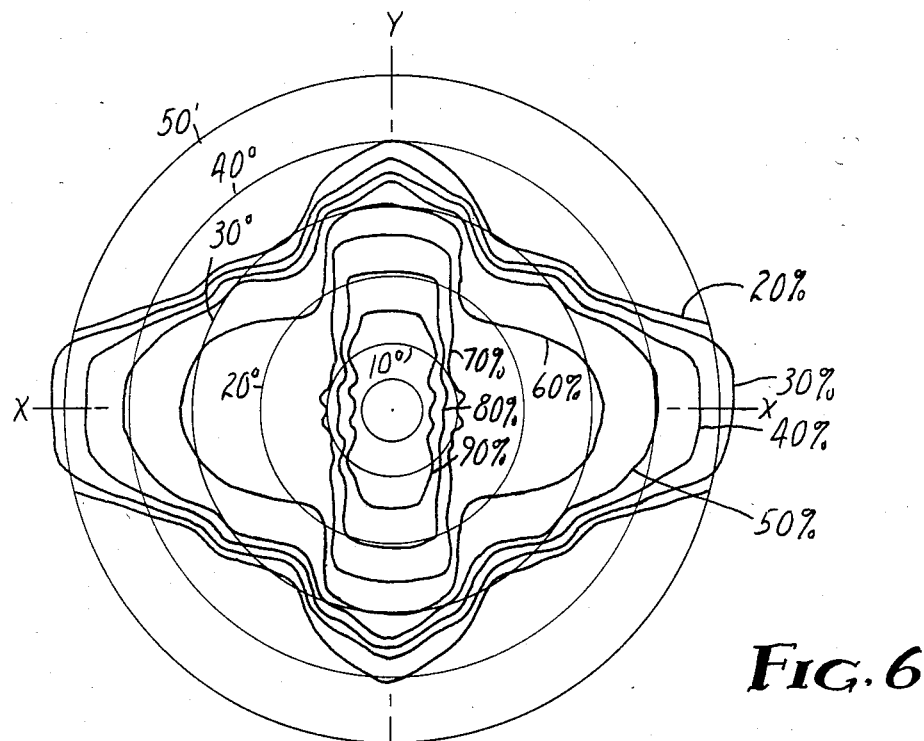
FIG. 6 is a graph of isobrightness curves for a representative matched pair of cube-corner elements, showing the percentage of the maximum retroreflection from such a pair of cube-corner elements that is retained when the light being retroreflected impinges on the elements at increasing incidence angles, i.e., at angles displaced from a line perpendicular to the base plane of the elements; the magnitude of the incidence angle is represented by the radial distance of a point on the curve from the origin of the graph and the rotational plane of the incidence angle is represented by the angular position of a point on the curve.

This result is further illustrated in FIG. 6 which is a set of isobrightness curves plotting the magnitude of retroreflection obtained from cube-corner elements as used in retroreflective articles of the invention (as described in Example 1 herein). The magnitude of retroreflection is plotted versus the magnitude of the incidence angle of the light being reflected (the angle between the incident light and a line perpendicular to the front face of the sheeting). Values plotted on the X-axis in FIG. 6 represent the magnitude of reflection for light incident on the elements in X-axis planes parallel to the planes defined by the optical axes of the elements; values plotted on the Y-axis are for light incident on the sheet in Y-axis planes perpendicular to the X-axis planes defined by the optical axes of the elements; and values plotted at points between the X and Y axes are for light incident on the elements in planes intermediate the perpendicular X and Y planes.

As may be seen, for the particular measurements reported in FIG. 6, the cube-corner elements reflect at 50% of maximum retroreflective brightness light that impinges on the elements in the X-axis plane at about 40° (the "half-brightness angle"), and reflect at 50% brightness light that impinges on the elements in the Y-axis plane at about 35°. Such an angular range in retroreflective brightness along two perpendicular planes is far beyond any range previously known to be obtained in a cube-corner retroreflective sheeting. As is also seen from FIG. 6, good retroreflective brightness is also obtained in planes intermediate the perpendicular planes.

Computer simulations of cube-corner designs based on designs of the invention indicate that, for best results, the optical axes of each pair of cube-corner elements abutting at a common edge lie in a single plane perpendicular to the edge and to the base plane. However, in other embodiments, the optical axes may be tilted in two directions, e.g., toward one edge as well as out of a plane that is perpendicular to the edge and the base plane.

The greatest improvement in angular range along the X-axis plane is obtained with the greatest amount of tilting of the optical axes, but at some degree of tilting, which varies with index of refraction of the materials of the retroreflective article or sheeting, the retroreflection of light that is perpendicular to the article (i.e, 0°-incidence-angle light) begins to decline rapidly. The degree of tilting which provides optimum angularity is generally an angle just short of the angle at which perpendicular retroreflection begins to decline rapidly. For materials having an index of refraction of 1.5 this angle is about 12°–13°, and it varies with the index of refraction ($\eta_D$) according to the following formula:

$$\theta = 54.736 - \sin^{-1}\left(\frac{\eta_{air}}{\eta_D}\right)$$

The optimum angle of tilting is also affected by the desired manufacturing technique, as well as by related questions as to desired areal density of cube-corner elements, and desired efficiency of reflection. For manufacturing techniques using a grooved master, the degree of tilting is limited by the fact that if the groove between matched pairs of elements abutting at a common edge (e.g., the groove 24 in FIG. 3) is of too large an angle, the grooving tool will remove portions of edges of adjacent elements that abut the groove on either side of the matched pair of elements. This fact can be illustrated in FIG. 3 by reference to cube-corner element $10_9$, which abuts groove 24 and is adjacent to a matched pair of elements. If the degree of tilting of the elements pictured in FIG. 3 is increased beyond a certain angle, which is found to be 9.736° for an array as shown in FIG. 3 in which the optical axes of a matched pair of elements lie in a common plane, the angle of the groove 24 increases to such an extent that the edge 29 of element 10₉ would penetrate into the groove. Thus the grooving tool forming the groove 24 removes a portion of the element 10₉ (and similar elements abutting groove 24) at the edge 29.

Removal of a portion of the elements abutting groove 24 can be avoided by separating cube-corner elements, e.g., by forming the bottom of grooves 22 and/or 23 with a flat area or trough. Such a separation reduces the magnitude of retroreflection, since there are then fewer cube-corner elements per unit area of sheeting, but the separation has other advantages such as allowing an underlying substrate (which may have a desired color, for example) to be viewed through the flat area of the bottom of the groove, or allowing transmission of light through the flat area (as when a sheeting of the invention is used as the front plate of an internally illuminated sign).

Also, removal of a portion of an adjacent element, and the accompanying loss of retroreflection, can be acceptable under some circumstances when the total magnitude of retroreflection is otherwise sufficient.

Somewhat greater retroreflection of 0°-incident light can be obtained with a degree of tilting less than the optimum for Y-axis angular range, but generally, for materials having an index of refraction of 1.5, the degree of tilting will be at least 7°, and will vary with index of refraction according to the above-stated formula. For 1.6-index materials, the degree of tilting will generally lie within the range of 9°–15°, preferably 10°–13° for articles having flat-bottomed grooves between elements, and otherwise preferably less than 9,736°.

Articles of the invention may be made as one integral material, e.g., by embossing a preformed sheet with a described array of cube-corner elements, or casting a fluid material into a mold; or they may be made as a layered product, e.g., by casting the elements against a preformed film as taught in U.S. Pat. No. 3,684,348, or by laminating a preformed film over the front face of individual molded elements.

Acrylics, which generally have an index of refraction of about 1.5, are one useful material for an integral sheet material, or they are useful as a facing adhered over the cube-corner retroreflective elements in a layered product to obtain good outdoor weathering properties. Other useful materials include polycarbonates, which have an index of refraction of about 1.6, reactive materials such as taught in United Kingdom Pat. No. 2,027,441; polyethylene-based ionomers (marketed under the name of "SURLYN"), polyesters, and cellulose acetate butyrates. Generally any transparent material that is formable typically under heat and pressure may be used.

Retroreflective articles of the invention may incorporate cube-corner elements in a wide range of sizes. For flexible sheeting of the invention (for example, rollable around a three-inch-diameter core), the elements preferably have a size (i.e., spacing between the center lines of grooves) less than about 0.025 inch. The most common rigid cube-corner retroreflective articles use cube-corner elements of a size of about 0.060 to 0.100 inch. However, the beneficial increased angularity offered by the invention will also occur with larger sizes. For example, the effects achieved by the invention are illustrated in the examples below by using macro-sized glass cube-corner retroreflective elements.

Since sheeting of the invention is typically used by adhering it to a substrate, and since it is desired to maintain an air interface at the three lateral mutually perpendicular surfaces of the cube-corner elements, the sheeting is preferably sealed to a back film in a cellular pattern such as taught in U.S. Pat. No. 4,025,159. A variety of heat-activated, solvent-activated, pressure-sensitive or other adhesives may then be coated on or laminated to the back surface of the sealing film for use in adhering the sheeting to a substrate. Other structure may also be added to a retroreflective article of the invention, such as specularly reflective coatings over the mutually perpendicular lateral faces of the elements, and protective films over the front face of a retroreflective article, e.g., to improve weathering properties.

The invention will be further illustrated by the following examples.

EXAMPLE 1

A series of large cube-corner retroreflective elements were machined from glass. These glass bodies were tetrahedrons, having three mutually perpendicular lateral faces and a bottom or base face. The latter face was at a different angle in each element of the series so as to place the optical axes of the different elements at different angles. The base edges of the lateral faces of the elements were between about 1½ and 2 inches (3.8 to 5 centimeters) in length. Some elements or bodies in the series were machined from glass having an index of refraction of 1.5 and some from glass having an index of refraction of 1.6. Four different elements of each index of refraction were prepared. The optical axes of the different 1.5-index elements were tilted toward one edge in a plane perpendicular to that edge respectively 7.2°, 9.2°, 11.3°, and 13.6°. The different 1.6-index elements were tilted respectively 9.2°, 11.3°, 13.6° and 18.1°. Total light return in a 2-degree-radius cone was then measured for each of the elements by conventional darkroom photometry techniques. To determine the amount of light that would be returned by a matched pair of the elements, the measured data for an element was mathematically summed with the data that such an element would provide if rotated 180°. Isobrightness curves were drawn using such a summation of data for the 1.5-index 9.2°-tilt elements and are shown in FIG. 6. The results for the other elements are shown in Table I.

TABLE I

| | Mathematical sum of retroreflection from matched pairs of macro-sized cube-corner elements which differ as to index of refraction and angle of tilt | | | | | | | |
|---|---|---|---|---|---|---|---|---|
| | 1.5-index Tilt angle | | | | 1.6-index Tilt angle | | | |
| Incidence angle | 7.2° | 9.2° | 11.3° | 13.6° | 9.2° | 11.3° | 13.6° | 18.1° |
| | (normalized percent of brightest retroreflection) | | | | | | | |
| X-axis | | | | | | | | |
| 0 | 100 | 100 | 100 | 54 | 100 | 100 | 100 | 56 |
| 5 | 97 | 98 | 64 | 67 | 100 | 98 | 72 | 52 |
| 10 | 73 | 69 | 64 | 72 | 99 | 72 | 70 | 56 |
| 20 | 60 | 67 | 72 | 87 | 68 | 75 | 82 | 68 |
| 30 | 52 | 62 | 69 | 93 | 62 | 74 | 87 | 79 |
| 40 | 39 | 50 | 59 | 83 | 51 | 63 | 80 | 77 |
| 50 | 24 | 33 | 41 | 63 | 35 | 46 | 62 | 64 |
| Y-axis | | | | | | | | |
| 0 | 100 | 100 | 100 | 54 | 100 | 100 | 100 | 56 |
| 5 | 97 | 99 | 98 | 56 | 99 | 99 | 99 | 62 |
| 10 | 94 | 96 | 95 | 85 | 96 | 95 | 95 | 100 |
| 20 | 82 | 82 | 81 | 90 | 84 | 82 | 81 | 85 |
| 30 | 63 | 62 | 60 | 64 | 65 | 61 | 58 | 59 |
| 40 | 7 | 24 | 31 | 32 | 42 | 36 | 31 | 29 |

TABLE I-continued

| | Mathematical sum of retroreflection from matched pairs of macro-sized cube-corner elements which differ as to index of refraction and angle of tilt | | | | | | | |
|---|---|---|---|---|---|---|---|---|
| | 1.5-index Tilt angle | | | | 1.6-index Tilt angle | | | |
| Incidence angle | 7.2° | 9.2° | 11.3° | 13.6° | 9.2° | 11.3° | 13.6° | 18.1° |
| | (normalized percent of brightest retroreflection) | | | | | | | |
| 50 | 1 | 2 | 2 | 2 | 8 | 13 | 7 | 5 |

EXAMPLE 2

A diamond-shaped flat acrylic plate having a 6-inch axial length was cut with three intersecting sets of parallel V-shaped grooves using a diamond-tipped tool. Two sets of the grooves intersected at an angle of 70°. These grooves were cut with a tool haivng an included angle of 60°, 36 minutes, and were spaced on 0.012-inch (0.205 millimeter) centers. The third set of grooves intersected the first two sets of grooves at an angle of 55°. Individual grooves of the third set were in line with the points of intersection of the grooves of the first two sets. The grooves in the third set were cut using a tool having an included angle of 88°, 51 minutes at a spacing of 0.0105-inch (0.254 millimeter).

The described grooving provided an array of cube-corner elements arranged in pairs with the optical axes of each element of a pair being tilted towards one another through an angle of 9.2°, i.e., 9.2° from a line perpendicular to the face of the acrylic plate.

An electroform was made from the grooved plate by electrolytic deposition of nickel onto the plate, and the electroform was used as a stamper to emboss the pattern of the electroform into a preformed 0.030-inch-thick (750 micrometers) acrylic film having an index of refraction of about 1.49. The electroform was placed in a platen press and the pressing was done at a temperature of 350° to 400° F.

Figure 7:
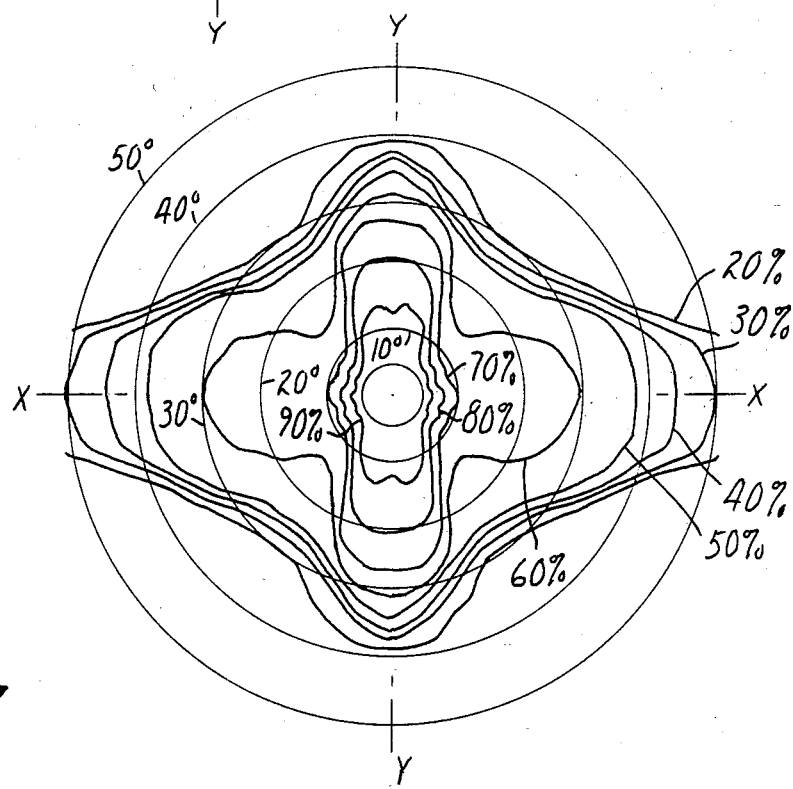
FIG. 7 is a graph of isobrightness curves measured for a representative retroreflective sheeting of the invention.

The total light retroreflected in a 2-degree-radius cone by the stamped retroreflective sheeting was then measured for light impinging on the sheeting at various incidence angles by darkroom photometry techniques. The results are shown in FIG. 7 as a set of isobrightness curves presenting retroreflective brightness as a percentage of maximum brightness and as a function of the magnitude and rotational plane of the incidence angle. FIG. 7 is seen to correlate well with the results presented in FIG. 6.

What is claimed is:

1. Retroreflective article comprising at least one matched pair of cube-corner retroreflective elements which are rotated 180° with respect to one another, the three mutually perpendicular lateral faces of each element being defined at their bases by linear edges that lie in a common plane, and the optical axes of each element of the pair being tilted towards one edge of that element, whereby the retroreflective angularity of the article is increased both in an X-axis plane that is perpendicular to said common plane and to said edge toward which an element is tilted, and in a Y-axis plane that is perpendicular to both the X-axis plane and the common plane.

2. Retroreflective article of claim 1 in which the cube-corner retroreflective elements comprise material having an index of refraction of about 1.5, and the optical axes of the pair of elements are each tilted to an angle between about 7 and 13 degrees from a position perpendicular to said common plane in which the base edges of the lateral faces lie.

3. Retroreflective article of claim 2 in which the cube-corner retroreflective elements comprise material having an index of refraction of about 1.5, and the optical axes of the pair of elements are each tilted between 8 and 9.736 degrees from a position perpendicular to said common plane.

4. Retroreflective article of claim 1 in which the optical axes of the pair of cube-corner retroreflective elements are coplanar.

5. Flexible retroreflective sheeting comprising a polymeric sheet material which carries on one large-area side a dense array of cube-corner retroreflective elements, the three mutually perpendicular lateral faces of the elements being formed by three sets of intersecting continuous grooves having a common depth and a V-shaped cross-section so that the base edges of the lateral faces of the elements lie in a common plane established by the bottom of the grooves; at least some of said elements being arranged in pairs in which the elements are rotated 180° with respect to one another, with the optical axes of the elements in each pair being tilted towards one another, whereby the angularity of the sheeting is increased both in an X-axis plane that is perpendicular to said common plane and to the common base edge between each pair and in a Y-axis plane perpendicular to the X-axis plane and the common plane.

6. Retroreflective sheeting of claim 5 in which the material from which the cube-corner retroreflective elements are made has an index of refraction of about 1.5, and the optical axes of the elements are tilted to an angle between about 7 and 13 degrees from a position perpendicular to said common plane in which the base edges of the lateral faces lie.

7. Retroreflective sheeting of claim 5 in which the polymeric material has an index of refraction of about 1.5, and the optical axes of the cube-corner retroreflective elements are each tilted between 8 and 9.736 degrees from a position perpendicular to said common plane.

8. Retroreflective sheeting of claim 5 in which the optical axes of the pair of cube-corner retroreflective elements are coplanar.

* * * * *